United States Patent Office 3,226,336
Patented Dec. 28, 1965

3,226,336
COMPOSITION AND PROCESS FOR PREPARING A THREE-COMPONENT POLYMERIZATION SYSTEM
Albert Schrage, East Orange, N.J., and Emory J. Pless, Brooklyn, N.Y., assignors to Rexall Drug and Chemical Company, Los Angeles, Calif., a corporation of Delaware
No Drawing. Filed May 8, 1963, Ser. No. 279,016
9 Claims. (Cl. 252—429)

This invention relates to a novel three-component catalyst system for the polymerization of alpha-olefins to high molecular weight rubbery polymers.

It is known in the art to employ titanium trichloride and diethylaluminum monochloride to ploymerize propylene to a high isotactic content polymer. Belgian Patent 543,259, for example, describes the use of $TiCl_3$ and diethylaluminum monochloride to polymerize either propylene or butene-1 to highly crystalline homopolymers.

The prior art also describes the employment of titanium tetrachloride prereacted with an aluminum compound such as aluminum triethyl to polymerize alpha-olefins such as propylene to a high molecular weight polymer containing substantial amounts of low molecular weight atactic residues. The foregoing published art thus illustrates two well known system employing a titanium halide and an aluminum compound for polymerization of olefins to either high isotactic content type polymers or to those containing a substantial amount of atactic material.

The titanium containing catalytic system for polymerization of alpha-olefins has come to be one of the preferred systems for obtaining a variety of polymers, whether of the crystalline or amorphous variety, partly due to the fact that titanium can be sufficiently removed from the ultimate polymer, or it can be inactivated by chemical treatment, so that polymers resulting from use of these systems can be readily processed in known plastics processing machinery.

The use of other transition metal halides of Group IVa of the Periodic Table according to Mendeleef as olefin polymerization catalytic components while yielding useful results usually are not as active as titanium in polymerization reactions or the catalytic residues remaining in the polymers are difficult to remove and in some instances are more apt to discolor the polymer when precessed according to known techniques. This invention provides a novel catalyst system comprising a titanium halide and other components to be described herein which is useful in the preparation of high molecular weight rubbery polymers.

In accordance with the foregoing, it is an object of this invention to provide novel catalysts for the polymerization of alpha-olefin monomers including ethylene.

A further object of this invention is to provide a novel three-component catalyst for the copolymerization of alpha-olefin monomers.

A still further object of this invention is the provision of a novel three-component catalyst for polymerizing propylene or butene-1 or higher alpha-olefin monomers to high molecular weight rubbery materials.

A specific object of this invention is the provision of a three-component catalyst for the preparation of block copolymers of alpha-olefins wherein a rubbery component can be sequentially polymerized onto linear polymers, thereby imparting certain beneficial properties.

This invention provides a polymerization catalyst comprising the product formed by admixing (1) a titanium oxyhydrocarbon, (2) a titanium trihalide and (3) an aluminum compound of the formula $AlR_nX_{(3-n)}$ where R is an alkyl group, X is hydrogen or a halogen and $n$ is a number of from 2 to 3 inclusive.

A preferred embodiment of this invention provides a three-component catalyst composition which comprises the product formed by adding (1) a $Ti(OR)_4$ compound where R is an alkyl group containing from 1 to 10 carbon atoms to the reaction product of (2) titanium trichloride and an aluminum compound of the formula $AlR_nX_{(3-n)}$ where R is an alkyl group containing from 1 to 10 carbon atoms, X is chlorine or hydrogen and $n$ is a number of from 2 to 3 inclusive.

The three-component catalyst of this invention is useful in the polymerization reactions set forth hereinabove and in a preferred embodiment of this invention, the three-component catalyst system is prepared in certain molar ratios and preferred order of addition. In accordance herewith, it is preferred to prereact titanium trichloride with an aluminum trialkyl or an aluminum dialkyl monochloride in a hydrocarbon diluent and after this reaction, to add to the product formed the titanium oxyhydrocarbon. Best results are obtained in polymerization reactions for preparing high molecular weight rubbery polymers when the molar ratios of the catalyst components, based on the metals, for the system titanium oxyhydrocarbon:titanium trichloride:aluminum compound are from 0.25 to 1:1:2. For the specific system titanium oxyhydrocarbon:titanium trichloride:dialkylaluminum monohalide, the ratios can be 0.25 to 1:1:1 to 8 or higher. For simplicity, the ratios for the three components will hereinafter be set forth as 0.25 to 1:1:2, although as mentioned, when dialkylaluminum halide is used, the molar ratio of this component can be somewhat higher. The specific examples to be presented hereinafter will demonstrate the novel results obtained by the use of this novel three-component catalyst system.

The first component of the catalyst system:

$Ti(OR)_4:TiCl_3$:aluminum compound titanium oxyhydrocarbon is broadly one where the hydrocarbon is an alkyl, aryl, alkenyl, cycloalkyl, or cycloalkenyl group and more specifically one wherein the hydrocarbon group contains preferably from 2 to 10 carbon atoms. The hydrocarbon group can thus be ethyl, propyl, isopropyl, butyl, isobutyl, pentyl, hexyl, heptyl, octyl, nonyl and decyl or even higher. The aryl radical can be a phenyl group, while the alkenyl can correspond to the foregoing alkyl radicals except that it will contain unsaturation. Cycloalkyl radicals such as cyclohexyl or cycloalkenyl radicals such as cyclohexenyl, etc. are likewise applicable. The oxy-alkyl radicals are preferred, specifically those whose solubility in hydrocarbons is substantial, for example, those containing two or more carbon atoms. Reference will be made hereinafter to two commercially available titanium oxyhydrocarbons: tetrabutyl and tetraoctyl titanates, in the description of this invention.

A convenient way of preparing the titanium oxyhydrocarbons is by the reaction of titanium tetrachloride with an alcohol containing from 2 to 10 carbon atoms or higher. A specific example illustrating the preparation of tetrabutyl titanate will be presented hereinafter. It will be appreciated, however, that processes or techniques for preparing these catalytic components are known in the art.

The second component of the catalyst system $Ti(OR)_4:TiCl_3$:aluminum compound is titanium trichloride which can be prepared by any of several well known techniques. The preferred titanium trichloride is a crystalline hydrocarbon-insoluble product. Reference is made to U.S. Patent 3,032,510, dated May 1, 1962, which is incorporated herein by reference, which illustrates techniques for preparation of titanium trichloride. The preferred titanium trichloride is one resulting from the reduction of titanium tetrachloride with a Group II or III metal of the Periodic Table according to Mendeleef, thereby resulting in a titanium trichloride containing in solid solution ("cocrystallized") a metal chloride from one of said groups. The formula $n_1TiCl_3 \cdot MCl_{n_2}$ where $n_1$ is a number of from 1 to 5 and $n_2$ corresponds to the valence of the metal M, illustrates this catalytic component. M can be aluminum, zinc or magnesium, etc., aluminum being preferred. The cocrystallized titanium trichloride·aluminum chloride composition can be activated by dry ball milling as described in the foregoing patent.

The third component of the catalyst system:

Ti(OR):TiCl$_3$:aluminum compound is an aluminum trialkyl, an aluminum dialkyl hydride or preferably an aluminum dialkyl monochloride. The alkyl groups in this embodiment of the catalyst component can contain from 1 to 10 carbon atoms, although the examples will illustrate the specific component diethylaluminum monochloride, aluminum triethyl and diisobutyl aluminum hydride.

The amount of three-component catalyst which is useful in polymerization reactions is not critical. Thus, from .01 to 10 weight percent catalyst based on the diluent present can be used depending on the pressures used in carrying out the reactions. Lower or higher amounts can also be used however.

Although the three-component catalyst hereinabove described is useful in polymerization involving ethylene, propylene, butene-1 and higher alpha-olefin monomers or mixtures thereof, these catalysts are specifically useful for preparing high molecular weight rubbery polymers or copolymers of these alpha-olefin monomers including block copolymers. It is preferred, therefore, that for use in preparation of rubbery polymers or copolymers, that the catalytic mixture be prepared by (1) prereacting titanium trichloride with an aluminum trialkyl, diethylaluminum monochloride or dialkylaluminum hydride, and after this reaction, which can occur in a hydrocarbon diluent such as heptane, (2) adding the tetra alkyl titanate. In a more specific embodiment of this invention, the tetra alkyl titanate is added within certain critical ratios. Thus, for a TiCl$_3$·AlR$_n$X$_{(n-3)}$ system and a molar ratio of 1:2 based on Ti/Al, the tetra alkyl titanate is employed in ratios of 0.25:1 based on the metal. Upon use of this catalyst in the polymerization of propylene or butene-1, for example, there is a very large reduction in stereospecificity for propylene polymerization and completely for butene-1 polymerization and usually an increase in polymerization rate and a reduction in molecular weight, as will be illustrated in the examples. The rate of polymerization of ethylene is, in some instances, slightly reduced by the addition of the titanate to titanium trichloride and diethylaluminum monochloride, but when triethylaluminum is used as the third component, the rate increases or remains unchanged.

As indicated heretofore, the preparation of the catalyst herein occurs in a hydrocarbon solvent. Paraffinic hydrocarbons, either those normally liquid or liquified at the conditions of reaction are applicable. Preferred, are liquid hydrocarbons of the paraffinic type containing from 5 to 10 carbon atoms or more. Aromatic hydrocarbons such as benzene, the xylenes, toluene, etc. can also be used as well as chlorinated solvents. The reaction between the titanates and the pre-reacted TiCl$_3$AlR$_n$X$_{(3-n)}$ thus results in a novel three component catalytic system in solution in a hydrocarbon. The exact reaction occurring upon admixing the catalytic components is not presently understood, although it may be the formation of some catalytically active complex which possesses certain unique properties. Thus, if the titanate is pre-reacted with titanium trichloride first and then the diethylaluminum monochloride is incorporated, the titanate does not affect the properties of, for example, TiCl$_3$:AlR$_n$X$_{(3-n)}$ as a stereospecific catalyst. In other words, this two component catalyst retains its ability to polymerize propylene to a high isotactic content polymer. When, however, the titanate is added to the pre-reacted TiCl$_3$:AlR$_n$X$_{(3-n)}$ and specifically in a mole ratio of 0.25 to 1 as heretofore indicated, then upon its use for polymerizing propylene, the titanate component affects the stereospecificity of the two component catalyst and there is obtained a propylene polymer containing a high percentage of rubbery atactic high molecular weight material. That the titanate adds some unpredictable element to the function of the novel catalysts herein was borne out by the fact that when it was added to a catalyst system known to give a 97% soluble (in benzene) rubber, that is, triethylaluminum and titanium tetrachloride, the result was a decrease in solubility and an increase in molecular weight of the rubber (ethylene-propylene) at a reaction temperature of 40° C. Thus, the function of the titanium oxyhydrocarbon was unpredictable, first in substantially consistently increasing the polymerization rate of known olefin polymerization catalyst systems and secondly in reducing molecular weight to an extent where extraneous molecular weight reducing agents can be eliminated, for example, hydrogen and finally in its behavior towards reducing sterospecificity of highly sterospecific catalysts, that is, resulting in more soluble rubbery content.

The following examples illustrate the novel catalysts of this invention.

*Example 1*

This example demonstrates the preparation of tetrabutyl titanate according to methods known in the art.

A solution of 100 grams of n-butanol and 106 grams of triethylamine in 500 ml. of dry hexane are charged into a stirred 500 ml. round bottom flask under a nitrogen atmosphere. Titanium tetrachloride (50 grams) is then added dropwise from an addition funnel. After completion of this addition, the mixture is stirred for 24 hours at room temperature. The reaction mixture is then filtered under nitrogen and the filtrate is concentrated in vaccuo and distilled, B.P. 159° C./1 mm.).

Tetra alkyl titanates can, in general, be prepared by the example given above or by any known technique in the art.

*Example 2*

This example demonstrates a general procedure for preparing the catalysts of this invention.

A two liter stirred flask equipped with a thermometer, a gas inlet tube, a gas outlet tube and addition funnels is flushed with nitrogen gas before the preparation of the catalyst and a nitrogen atmosphere is maintained at all times. To prepare the catalyst, the reactor is first charged with one liter of n-heptane previously dried with metallic sodium. After this, a slurry of 2.5 grams (0.013 mole) of TiCl$_3$:0.33AlCl$_3$ is added in a solution of 3.2 grams (0.027 mole) of diethylaluminum monochloride in 100 ml. of n-heptane. The mixture is then heated to 60° C. and maintained at 60° C. for 15 minutes. Tetrabutyl titanate (2.2 grams; 0.0065 mole) is then added and the catalyst prepared in this manner can then be used to initiate olefin polymerization.

In the examples which follow which illustrate polymerization reactions, unless otherwise indicated, the reaction was carried out in heptane as a diluent at 60° C. and at atmospheric pressure in a two liter reactor. Monomer gases were fed into the reactor in excess of the amount absorbed and reacted. Reaction times were about four (4) hours, except where the reaction was terminated earlier. The polymers formed were collected by diluting the reaction mixture with one volume of isopropyl alcohol followed by shredding of the coagulated polymer in a laboratory blender with fresh isopropyl alcohol, then heating with stirring at about 80° C. for 1 to 2 hours in isopropyl alcohol to complete catalyst removal, filtering off the polymer and vacuum drying. Table I below illustrates various conditions and various olefin polymerizations.

In the examples given below, the intrinsic viscosity was measured in decalin at 135° C. Intrinsic viscosity was determined according to F. W. Billmeyer, "Textbook of Polymer Chemistry," Interscience, New York, 1957. The solubility of polypropylene was determined in boiling n-heptane using a laboratory extractor. Also, unless otherwise noted, the catalyst mole ratios are based on the metal.

with the aluminum compound, that the effect of reducing stereospecificity of the catalyst is not realized. It is preferred, therefore, to pre-react the titanium trichloride with the aluminum compound followed by the addition of the tetra alkyl titanate in polymerization systems where the partial rubbery polymer form is desired.

*Example 4*

TABLE II

| Run No. | Monomer | Catalyst System | Catalyst Mole Ratios | Rate g./g. TiCl$_3$ per hr. | Intrinsic Viscosity | Percent Soluble |
|---|---|---|---|---|---|---|
| 10 | Butene-1 | 3 TiCl$_3$·AlCl$_3$:DEAC | 1:2 | 21 | 2.26 | |
| 11 | Butene-1 | Ti(OC$_8$)$_4$:3TiCl$_3$·AlCl$_3$DEAC | 0.5:1:2 | 17 | 2.96 | 100 |

In the above, Run 10 was carried out according to the prior art at 65° C. The polymer produced contained

*Example 3*

TABLE I

| Run No. | Monomer | Catalyst System | Catalyst Mole Ratios | Rate g./g., TiCl$_3$ per hr. | Intrinsic Viscosity | Percent Soluble |
|---|---|---|---|---|---|---|
| 1 | Propylene | 3TiCl$_3$·AlCl$_3$:DEAC[1] | 1:2 | 16 | 6.07 | 4 |
| 2 | Propylene | Ti(OC$_4$)$_4$[2]: 3TiCl$_3$·AlCl$_3$:DEAC | 0.5:1:2 | 27 | 3.71 | 47 |
| 3 | Propylene | Ti(OC$_4$)$_4$: 3TiCl$_3$·AlCl$_3$:DEAC | 0.25:1:2 | 23 | 3.77 | 43 |
| 4 | Propylene | Ti(OC$_4$)$_4$: 3TiCl$_3$·Al$_3$I$_3$:DEAC | [3]1:1:2 | | | |
| 5 | Propylene | Ti(OC$_4$)$_4$: 3TiCl$_3$·AlCl$_3$:DEAC[4] | 0.25:1:2 | 13 | 7.81 | 20 |
| 6 | Propylene | Ti(OC$_8$)$_4$[5]: 3TiCl$_3$·AlCl$_3$:DEAC | 0.5:1:2 | 19 | 4.49 | 44 |
| 7 | Propylene | Ti(OC$_4$)$_4$: 3TiCl$_3$·AlCl$_3$:TEA[6] | 0.25:1:4 | 73 | 4.1 | 29 |
| 8 | Propylene | Ti(OC$_8$)$_4$: 3TiCl$_3$·AlCl$_3$:TEA | 0.25:1:4 | 44 | 4.77 | 24 |
| 9 | Propylene | Ti(OC$_8$)$_4$: 3TiCl$_3$·AlCl$_3$:i-Bu$_2$AlH[7] | 0.5:1:2 | 40 | 2.3 | 64 |

[1] DEAC=Diethylaluminum monochloride.
[2] Ti(OC$_4$)$_4$=Tetrabutyl titanate.
[3] Reaction died out after half an hour—with negligible formation of polymer.
[4] The order of addition of the catalyst system was: addition of titanate to 3TiCl$_3$·AlCl$_3$ prior to addition of DEAC.
[5] Ti(OC$_8$)$_4$=Tetraoctyl titanate.
[6] TEA=Triethylaluminum. Reaction for 2 hours.
[7] Diisobutyl aluminum hydride. Reaction for 2.33 hours.

In the above, Run 1 illustrates a prior art method of polymerization of propylene at 65° C. to a high isotactic content polymer as evidenced by the percent heptane soluble figure of 4%. The high molecular weight, as evidenced by the intrinsic viscosity, should be noted, as well as the polymerization rate. Upon addition of a third component to the catalyst system of Run #1 consisting of tetrabutyl or tetraoctyl titanate, various observations can be made: First, the polymerization rate increased (Runs 2, 3, 6, 7, 8 and 9) while the isotactic content decreased (all runs except 5 which used a different order of addition of the catalyst); and secondly, there was a reduction in molecular weight of the polymers as evidenced by the intrinsic viscosity determinations (all runs except 5 which used a different order of addition of the catalyst).

The polypropylene produced in Runs 2, 3, 6, 7, 8 and 9 consisted of a large percentage of rubbery atactic polymer of reduced molecular weight, but no oily constituents.

It will be noted in Run 5 that when the tetra alkyl titanate is pre-reacted with titanium trichloride and then from 70 to 80% isotactic content. By the catalyst of this invention a completely soluble (in cold xylene) atactic form is prepared as indicated in Run 11. A completely soluble polybutene prepared with titanium containing catalysts has not, to our knowledge, been known heretofore. This is a highly desirable method of preparing polybutene for special application in the field of elastomers. U.S. Patent 3,061,600 shows the preparation of a polybutene which at best still contains a high percentage of crystalline content.

*Example 5*

TABLE III

| Run No. | Monomers (1:1 Mole Ratio) | Weight Percent Propylene In Polymer | Catalyst System | Catalyst Mole Ratios | Rate g./g. TiCl$_3$/hr. | Intrinsic Viscosity | Percent Soluble |
|---|---|---|---|---|---|---|---|
| 12 | Ethylene-Propylene | | HA:TEA[1] | 1:2.3 | 49 (40° C.) | 0.58 | 83 |
| 13 | Ethylene-Propylene | 42 | Ti(OC$_4$)$_4$:3TiCl$_3$·AlCl$_3$:DEAC | 0.5:1:2 | 25 | 3.05 | 90 |
| 14 | Ethylene-Propylene | | Ti(OC$_8$)$_4$:3TiCl$_3$·AlCl$_3$:DEAC | 0.5:1:2 | 22 | | 90 |

[1] HA=Hydrogen reduced TiCl$_4$.

The above runs demonstrate the preparation of ethylene-propylene copolymer rubbers by the catalysts of this invention. Run 12 shows a prior art reaction wherein solubility of the copolymer was measured in cold benzene. Runs 13 and 14 were carried out employing the catalysts of this invention and solubility of the copolymers was measured in cold xylene.

A high amorphous content type ethylene-propylene rubber is obtained by the three-component catalyst herein having an intrinsic viscosity which renders the copolymer suitable for application in the elastomeric field.

Example 6

TABLE IV

| Run No. | Percent Polybutene Prepolymer | Monomers (1:1 Mole Ratio) | Catalyst System | Catalyst Mole Ratios | Rate g./g. $TiCl_3$/hr. | Intrinsic Viscosity | Percent Solubles |
|---|---|---|---|---|---|---|---|
| 15 | | Ethylene-butene | $Ti(CO_8)_4$:$3TiCl_3$·$AlCl_3$:DEAC | 0.5:1:2 | 18 | | 87 |
| 16 | 19 | Ethylene-propylene | $Ti(OC_8)_4$:$3TiCl_3$·$AlCl_3$:DEAC | 0.5:1:2 | 21 | 3.8 | 91 |
| 17 | 11.5 | Ethylene-propylene | $Ti(OC_8)_4$:$3TiCl_3$·$AlCl_3$:DEAC | 0.5:1:2 | 26 | 2.0 | 97 |
| 18 | 6.4 | Ethylene-propylene | $Ti(OC_8)_4$:$3TiCl_3$·$AlCl_3$:DEAC | 0.5:1:2 | 28 | 4.3 | 97 |
| 19 | 2.7 | Ethylene-propylene | $Ti(OC_8)_4$:$3TiCl_3$·$AlCl_3$:DEAC | 0.5:1:2 | 30 | 3.1 | 92 |

In Runs 16 through 19 above, butene-1 was first introduced to the reaction and polymerized to the percent indicated based on the total polymer, followed by addition of ethylene-propylene in the ratios indicated. The rate of polymerization for this series of runs is that for the copolymerization reaction.

Runs 16 through 19 above demonstrate the ability to prepare rubbery terpolymers of butene-1, ethylene and propylene which were soluble in boiling benzene up to 97% by first preparing a partial polymer of butene-1 and then adding by copolymerization, an ethylene-propylene rubber. It will be observed that there is an optimum range (6 to 12%) of polybutent for maximum polymer solubility and that a practical range of molecular weight is achieved without a chain transfer agent.

Example 7

In this and other runs, an ethylene-propylene copolymer rubber block was sequentially formed on polypropylene after formation of an initial high isotactic content polypropylene by the use of a titanium trichloride diethylaluminum monochloride catalyst. The reactions were carried out in heptane at temperatures of from 50 to 60° C. and in all of these examples, the titanium trichloride and diethylaluminum monochloride were first pre-treated at 60° C. for about 15 minutes.

In this example, after the initial pre-reaction of titanium trichloride and diethylaluminum monochloride at a mole ratio of 1:4, propylene was introduced and polymerized for a period of two hours. After this period, tetraoctyl titanate was added in a mole ratio, based on the three components (tetraoctyl titanate: titanium trichloride: diethylaluminum monomchloride), of 1:1:4. A comononer feed in a 1:1 mole ratio of ethylene and propylene was then introduced to the reactor. In this example 113.6 grams of a block copolymer was obtained containing 10% by weight of ethylene-propylene rubbery copolymer. The block copolymer had an ASTM D–746–57T brittleness of −5° C.

A further run as above produced a block copolymer containing 20 percent by weight of an ethylene-propylene rubbery copolymer formed onto isotactic polypropylene.

In other runs, isotactic polypropylene was prepared as above and then rubbery polypropylene formed on the polymer. All of the foregoing polymers had excellent physical properties thereby enabling them for specific uses in plastics processing.

What is claimed is:

1. A polymerization catalyst comprising the product formed by admixing (1) a $Ti(OR)_4$, wherein R is an alkyl group containing from 1 to 10 carbon atoms, with the prereaction of (2) a crystalline titanium trichloride cocrystallized with aluminum chloride and (3) an aluminum compound selected from the group consisting of aluminum trialkyl, dialkyl aluminum monochloride and dialkyl aluminum monohydride, the molar ratio of components (1), (2) and (3) in the final catalyst product being 0.25 to 1:1:1 to 8 respectively.

2. The catalyst of claim 1 wherein the titanium trichloride is cocrystallized with aluminum chloride in accordance with the formula $nTiCl_3$·$AlCl_3$ and wherein $n$ is a digit of from 1 to 5.

3. The catalyst of claim 2 wherein the titanium trichloride is cocrystallized with aluminum chloride in accordance with the formula $3TiCl_3$·$AlCl_3$.

4. A polymerization catalyst comprising the product formed by admixing (1) a $Ti(OR)_4$ wherein R is an alkyl group containing from 1 to 10 carbon atoms with the prereaction product of (2) a crystalline titanium trichloride cocrystallized with aluminum chloride in accordance with the formula $3TiCl_3$·$AlCl_3$ and (3) an aluminum compound selected from the group consisting of aluminum trialkyl, diethylaluminum monochloride and diisobutyl aluminum monohydride, the molar ratio of components (1), (2) and (3) in the final catalyst product being 0.25 to 1:1:1 to 8 respectively.

5. The catalyst according to claim 4 wherein the $Ti(OR)_4$ is tetrabutyl titanate.

6. The catalsyt of claim 4 wherein the $TI(OR)_4$ is tetraoctyl titanate.

7. Process for preparing a polymerization catalyst which comprises reacting (1) a titanium trichloride cocrystallized with aluminum chloride with (2) an aluminum compound selected from the group consisting of aluminum trialkyl, dialkyl aluminum monochloride and dialkyl aluminum monohydride and adding to the resulting reaction product (3) a $Ti(OR)_4$ wherein R is an alkyl group containing from 1 to 10 carbon atoms, the molar ratio of components (3), (1) and (2) in the final catalyst product being 0.25 to 1:1:1 to 8.

8. The process according to claim 7 wherein the titanium trichloride is cocrystallized with aluminum chloride in accordance with the formula $nTiCl_3$·$AlCl_3$ and wherein $n$ is a digit of from 1 to 5.

9. The process according to claim 8 wherein the titanium trichloride is cocrystallized with aluminum chloride in accordance with the formula $3TiCl_3$·$AlCl_3$.

References Cited by the Examiner

UNITED STATES PATENTS

| | | | |
|---|---|---|---|
| 2,953,552 | 9/1960 | Stampa et al. | 252—429 |
| 3,001,951 | 9/1961 | Tornqvist et al. | 252—429 |
| 3,032,510 | 5/1962 | Tornqvist et al. | 252—429 |
| 3,032,511 | 5/1962 | Langer et al. | 252—429 |
| 3,061,602 | 10/1962 | Duck et al. | 252—429 |
| 3,073,811 | 1/1963 | Natta et al. | 252—429 |

OTHER REFERENCES

Natta, Journal of Polymer Science, vol. 51, pages 391 to 410 (1961).

TOBIAS E. LEVOW, *Primary Examiner.*

SAMUEL H. BLECH, *Examiner.*